United States Patent [19]
Beller

[11] 3,857,052
[45] Dec. 24, 1974

[54] INSPECTION AND ANALYSIS SYSTEM

[75] Inventor: Laurence S. Beller, Thousand Oaks, Calif.

[73] Assignee: Rockwell International Corporation, El Segundo, Calif.

[22] Filed: Apr. 28, 1972

[21] Appl. No.: 248,466

[52] U.S. Cl...... 340/149 R, 73/67.8 S, 178/DIG. 37
[51] Int. Cl. ...................................... G01n 24/04
[58] Field of Search............ 340/147, 149 R, 146.3; 178/DIG. 1, DIG. 36, DIG. 37; 235/151.3, 151; 73/67.7, 67.8 S, 69

[56] References Cited
UNITED STATES PATENTS

| | | | |
|---|---|---|---|
| 3,415,110 | 12/1968 | Cowan............................. | 73/67.8 S |
| 3,427,462 | 2/1969 | Cist .................................. | 346/33 F |
| 3,575,042 | 4/1971 | Lovelace et al. ................. | 73/67.8 S |
| 3,575,043 | 4/1971 | Allen et al. ....................... | 73/67.8 S |
| 3,646,805 | 3/1972 | Walters........................ | 73/67.8 S X |

OTHER PUBLICATIONS

Ultrasonics for Industry 1968 Conference Paper, "Collecting and Processing Automatic Inspection Data," D. Young, Ultrasonics, 1969, pgs. 51-56.

*Primary Examiner*—Donald J. Yusko
*Attorney, Agent, or Firm*—L. Lee Humphries; Henry Kolin

[57] ABSTRACT

An inspection system comprising a sensor for performing an inspection operation; positioning means operable to position the snesor with respect to a vessel to be inspected; an analog-to-digital converter connected to convert the signals from said sensor to digital signals; memory means connected to receive and store the signals from the converter; comparison means connected to receive the digital signals from the converter and previously stored signals from the memory means and establishing an output signal indicative of any significant difference between the digital signals and the previously stored signals; control means connected to receive the output signal from the comparison means and responsive thereto to cause the positioning means to move the sensor in a manner to define the affected area; and display means for visually displaying and permanently recording said signals. Both method and apparatus are disclosed.

4 Claims, 3 Drawing Figures

INSPECTION AND ANALYSIS SYSTEM

BACKGROUND OF THE INVENTION

1. Field of Invention

This invention relates to inspection systems and is particularly directed to methods and apparatus for performing in-service inspection of atomic reactors and the like.

2. Prior Art

In the nuclear reactor art, it is frequently necessary or desirable to inspect the walls of reactor vessels and the like. Moreover, it is preferable that such inspections be performed while the reactor remains in service. Numerous types of equipment have been proposed, heretofore, for accomplishing such inspections. However, none of the prior art inspection systems have been entirely satisfactory.

The major and overriding problems in ultrasonic inspections have not been associated with equipment or with techniques, but with the complete and objective analysis and interpretations of the data necessary to meet fully the intent of Section XI of the ASME Code. Small, but significant, anomalies in the data are often overlooked by the best observer, because the data are irregular and noisy and not in a form that can be compared objectively and precisely with code standards and previous measurements. A very large demand is placed on the inspector's judgment.

BRIEF SUMMARY AND OBJECTS OF INVENTION

These disadvantages of the prior art are overcome with the present invention and an inspection system is provided which is completely automatic and which, not only provides a permanent record, but compares the current record with the previous records and, where significant deviations are found, reinspects the appropriate portion of the vessel to define the affected area, and provides a permanent record of the detected anomaly.

The advantages of the present invention are preferably attained by providing an inspection system comprising a sensor for performing an inspection operation; positioning means supporting said sensor and operable to position said sensor with respect to a vessel to be inspected; an analog-to-digital converter connected to receive analog signals from said sensor and serving to convert said analog signals to digital signals; storage means connected to receive and store said digital signals; comparison means connected to receive said digital signals from said converter and operable to compare said digital signals with previously stored signals from said storage means and to establish an output signal indicative of any significant deviation of said digital signals from said previously stored signals; control means connected to receive said output signal from said comparison means and responsive thereto to cause said positioning means to move said sensor in a manner to define the area causing said significant deviation; and display means connected to receive the signals from said converter, said storage means, and said comparison means and operable to display and permanently record said signals.

In greatly simplified form, the system works as follows for a typical automatic ultrasonic inspection. The operator starts by adjusting the ultrasonic instrument in the conventional manner. He types in certain basic information, such as date, weld number, mode of inspection, equipment serial numbers, etc. The computer reads a numerical description of the part to be inspected and where it is located with respect to a reference position. It then moves the sensor to the beginning location and starts accepting ultrasonic data. The data represent the ultrasonic signal from small volume elements of the metal being inspected, the signal being measured many times for each small volume element. The data for each volume element are averaged and a variance about this average is determined numerically. This variance is a measure of the uncertainty in the signal determined by the signal-to-noise ratio, metallurgy, or other physical considerations, and can be used in valid statistical tests for significance.

In an inservice inspection, the computer locates on tape the data recorded from the same region of the weld during preservice inspection. The time between ultrasonic pulses and between movements of the sensor is used for this and for computing and comparisons. The signal from each volume element is tested statistically against the preservice data and against the data obtained from the calibration block. If there are no significant ultrasonic indications, the data are written on an output tape. If there is a significant change from preservice data or an indication significantly large compared to the calibration signals, the computer alerts the operator and directs the sensor to search for the outlines of the affected area in comparatively fine steps. The indications are thus mapped out and compared to preservice or calibration standards. Location, dimensions, and magnitude are typed out, and a properly scaled plan or section map displayed in true-coordinate form on an oscilloscope from which a full-size paper "hard-copy" can be obtained. The "flaw-map" data are written out on tape, and the system returns to normal inspection procedures.

The data are obtained, analyzed, and presented to the inspector in real time. This is available immediately as the inspection proceeds. He can take additional action on the spot, and his basic inspection records are complete as soon as the last portion of the weld has been scanned.

Accordingly, it is an object of the present invention to provide an improved inspection system.

Another object of the present invention is to provide a fully automatic inspection system which does not require control or supervision by an inspector.

Another object of the present invention is to provide a detailed and objective analysis of the inspection record.

A further object of the present invention is to provide an inspection system which provides a permanent record of the inspection.

An additional object of the present invention is to provide a fully automatic inspection system which automatically analyzes the record produced by the inspection in real time.

A specific object of the present invention is to provide an inspection system comprising a sensor for performing an inspection operation; positioning means supporting said sensor and operable to position said sensor with respect to a vessel to be inspected; an analog-to-digital converter connected to receive analog signals from said sensor and serving to convert said analog signals to digital signals; memory means connected to receive and said said digital signals; comparison means connected to receive said digital signals from said converter and operable to compare said digital signals with previously stored signals from said memory means and to establish an output signal indicative of any significant deviation of said digital signals from said previously stored signals; control means connected to receive said output signal from said comparison means and responsive thereto to cause said positioning means to move said sensor in a manner to define the area causing said significant deviation; and display means connected to receive the signals from said converter, said memory means, and ssaid comparison means and operable to display and permanently record said signals.

These and other objects and features of the present invention will be apparent from the following detailed description, taken with references to the accompanying drawing.

DETAILED DESCRIPTION OF ILLUSTRATED EMBODIMENT

Figure 1:
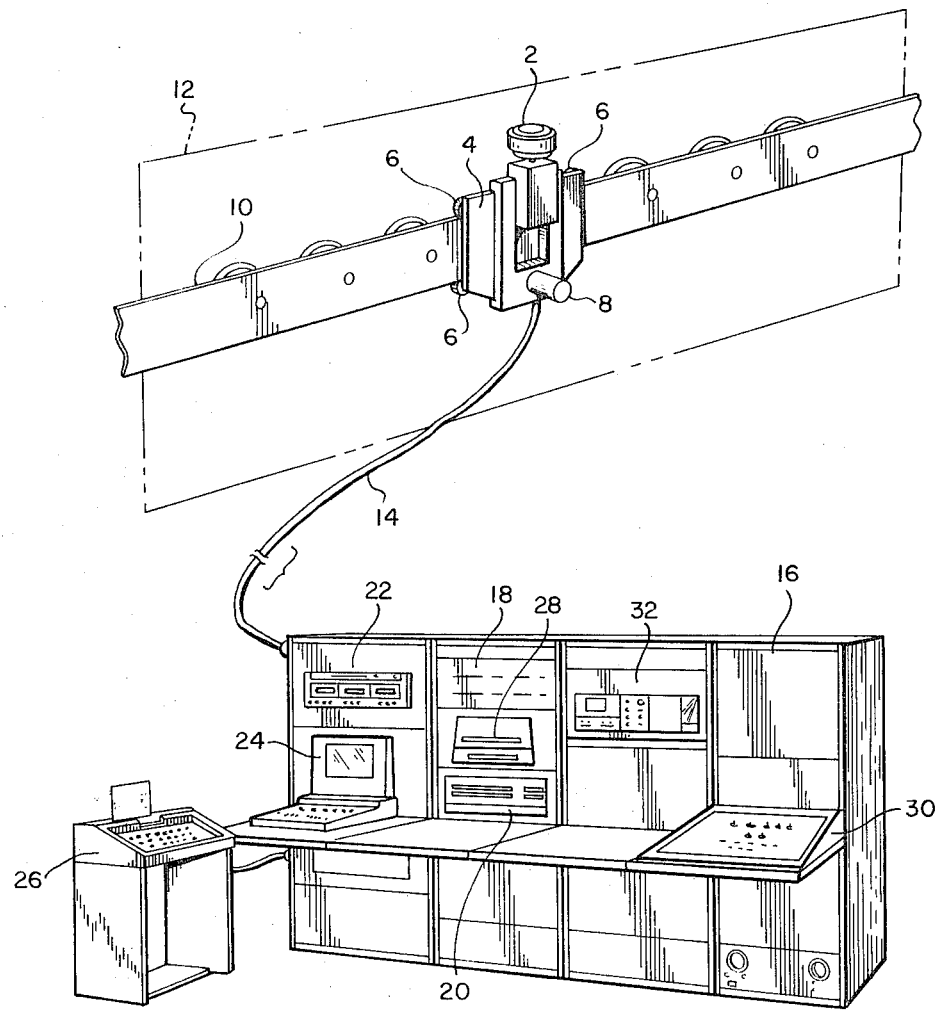
FIG. 1 is an isometric view of an inspection system embodying the present invention.

In that form of the present invention chosen for purposes of illustration, FIG. 1 shows an inspection system comprising a sensor 2, such as an ultrasonic inspection wheel, carried by a skate 4 having wheels 6 driven by a motor 8 to cause the skate 4 and sensor 2 to travel along a suitable track 10 to inspect the wall 12 of a reactor vessel or the like. The details of the skate 4 and track 10, and the method of mounting the track 10 on the vessel, are disclosed in U.S. Pat. No. 3,259,021, issued July 5, 1966 to Joseph S. Appelton et al. and assigned to the assignee of the present invention. Control signals for the sensor 2 and motor 8, and signals detected by the sensor 2 are carried by a suitable cable 14 which connects the skate 4 with a remotely located control unit, indicated generally at 16. The control unit 16 includes an analog-to-digital converter 18, a computer 20, a memory unit 22, a visual display unit 24, a teletype 26, a "hard copy" device 28, a manual control panel 30, and an inspection unit 32 for controlling the sensor 2 and visually displaying the analog signals detected by the sensor 2. Typically, the inspection unit 32 may be a Model 725 Immerscope manufactured by TekTran, a joint venture company of Air Products and Chemical, Inc., and North American Rockwell Corporation, or a Reflectoscope, Model No. UM771, manufactured by Sperry Division of Automation Industries.

In use, the sensor 2 is mounted on the skate 4 and the computer 20 commands the motor 8 of the skate 4 to cause the sensor 2 to scan a desired area of the wall 12. The analog signals detected by the sensor 2 are passed to the inspection unit 32 and, thence, to the analog-to-digital converter 18.

The analog-to-digital converter 18 consists of a range gate, integrator, and analog-to-digital converter (ADC). It provides the interface between the ultrasonic instruments and the computer 20.

Figure 3:
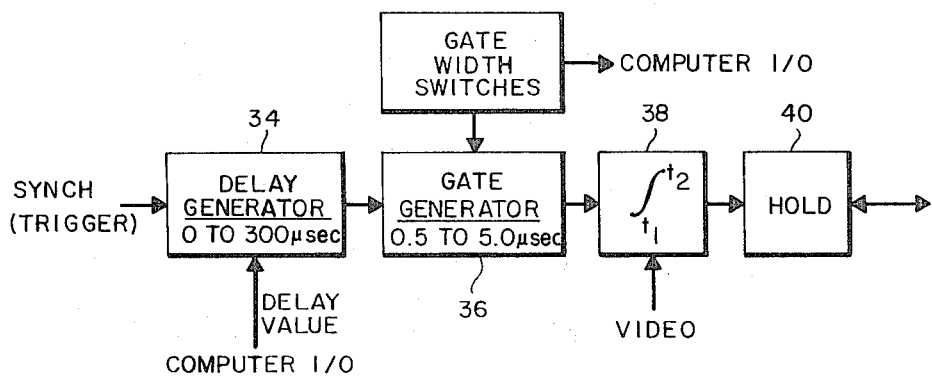
FIG. 3 is a more detailed block diagram of the range rate and integrator of the circuit of FIG. 2.

The range gate is a device which selects the particular portion of each pulse-echo signal from the sensor 2 to be digitized. As shown in FIG. 3, the analog-to-digital converter 18 consists of a delay generator 34, gate generator 36, integrator 38, and a hold circuit 40.

The circuit is triggered by a synchronizing pulse derived from the delayed-synch or video-synch of the inspection unit 32, as determined by front panel controls. This starts the time delay circuit 34. The length of the delay is determined by a digital command from the computer 20, and can be adjusted from approximately 0.1 to 300$\mu$ sec. At the end of this delay period, the video signal from the inspection unit 32 is gated into the integrator 38 for a fixed length of time. The integrated signal is held constant while the ADC determines it numerical magnitude.

The length of the gate is chosen by a front panel digital control to correspond to a sound-path length, or range increment, of about 0.5 in. The length of the delay is chosen from similar speed-of-sound considerations to correspond to the effective distance from the transducer to the particular volume element of the test sample being inspected. The signal presented to the ADC corresponds to the average echo signal returning from "pill box"-shaped volume element described by the diameter of the beam and 0.5 in. high, located at a distance (from the transducer determined by the delay setting).

The operating cycle is as follows. The computer 20 determines an initial delay setting corresponding to the first such volume element to be inspected, and sets the range gate 36 to this value. When a sufficient number of samples from this volume have been obtained, the next increment in delay is commanded and a new set of samples obtained. The process is continued until the most distant volume element at the probe position has been sampled. The probe is then moved to a new position and the cycle repeated.

The ADC will digitize the integrated signal to a precision of eight binary bits (plus sign), corresponding to a resolution of one part in 256. The ADC is a successive-approximation device. The signal from the hold circuit 40 is first compared to a reference corresponding to exactly half of full scale. If the signal exceeds the reference, a "one" bit is deposited into the most significant bit position of an output register. Otherwise, the bit is "zero." The difference between the input and the first reference is then compared to a new reference which is one-fourth of full scale, and the next most significant output bit obtained. This process continues until the eighth, least significant, bit is determined. The output register then contains a binary number proportional to the magnitude of the input.

The ADC is commanded to start conversion at the closing of the integrator gate 38. When it has finished the conversion, it provides a "ready" interrupt to the computer 20, discharges the hold circuit 40, and resets delay 34 and gate 36 circuits.

The computer 20 will be a 16-bit, fully parallel, general purpose machine with 8 to 12,000 words of random-access memory such as the Model 816 Controller, manufactured by Computer Automation. It will be equipped with hardware integer multiply/divide circuitry, a multilevel priority interrupt structure, power-fail circuitry to provide orderly shutdown without loss of data or program on detection of impending power failure, and a comparatively powerful instruction set.

Figure 2:
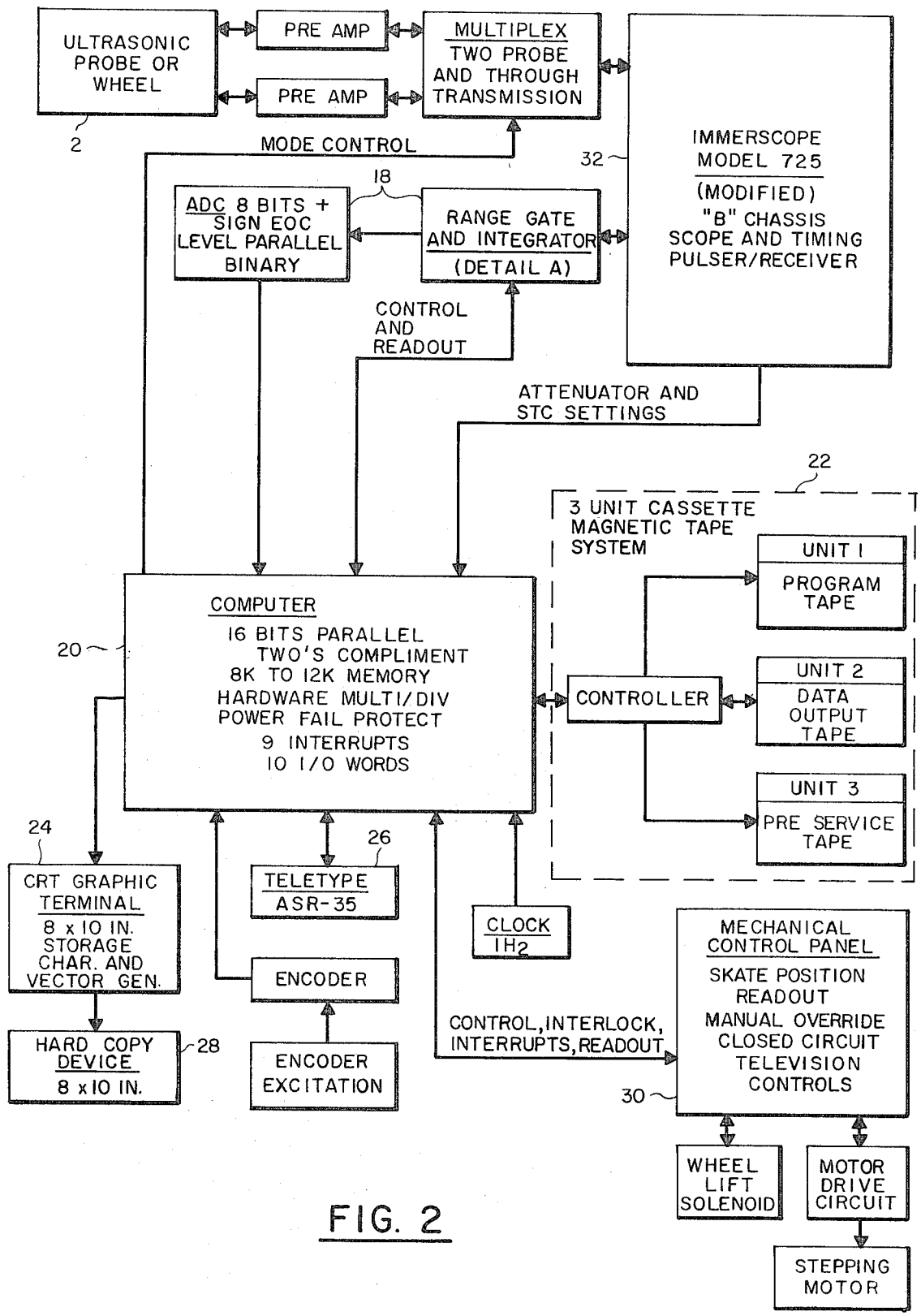
FIG. 2 is a block diagram of the circuitry of the systems of FIG. 1.

The primary input/output of programs and bulk data will be done with a three-unit cassette magnetic tape system as seen at 20 in FIGS. 1 and 2. This system provides rapid and highly flexible handling of this material. One of the cassette units will normally mount a tape containing all of the system programs, subroutines, and their variations. These are loaded into memory as needed, either by typed command from the operator or by automatic command from a program already in memory. The other two tape units are for input and output of inspection data, respectively. All of the data for a given weld can be contained easily on one cassette.

During inservice ultrasonic inspections, the input data tape unit will contain the signature data generated during preservice or baseline inspections of the weld currently being examined. The data are arranged on the tape so the computer 20 can easily and rapidly locate the previous data pertaining to the present location of the probe and read it into memory. The computer 20 can thus compare inservice and preservice or baseline data in real time.

The cassettes are used operationally during the inspections, both inservice and preservice. These will be copied onto "IBM compatible" tape in an off-line operation and duplicated to provide permanent plant records. One 2,400-ft. reel of the resulting computer tape will normally hold all of the digital data for a complete inspection of the plant.

A large-screen cathode-ray tube (CRT) graphics terminal 24 will be used for output display. This unit 24 will consist of an 8 by 10-in. storage (memory) CRT with an alphanumeric character and vector generator. The CRT can display tabular or analog data in any combination, and can retain the display indefinitely without intervention or "refreshment" by the computer. The terminal will be equipped with a hard copy device 28, similar to an office copy machine, which produces a permanent, full-sized paper copy of anything displayed on the CRT screen 24.

A teletype 26 will provide the dual functions of operator communications for commands to the computer 20 and entry into the computer 20 of auxiliary data for the inspections being performed. The typed copy, as prepared by the combination of the operator and computer 20, will form a part of the inspection record.

The computer 20 will be provided with eight priority interrupts. When an interrupt is activated by an external device, it causes a change in program flow to service the device causing the interrupt.

The computer time between pulses from sensor 2 and between motor steps will be used for other computations and for input or output (I/O) via tape, teletype, or CRT, effectively interleaving the many functions performed by the computer. Interrupts can be enabled or disabled under program control so the computer can ignore any device when it is not needed.

Information on the state of the mechanical and instrument systems is fed to the computer by way of a "system status word." This information includes the position of the sensor 2, the condition of limit stops, of the skate 4, the condition of the multiplex, and the status of the closed circuit television and recording system. Output commands to the mechanical system for motion of the skate 4, multiplex setting, etc., will be communicated through a "system command word." Each of these on/off functions will be tied to a particular bit position in the command word and activated by the output of "1" at its bit location. The computer 20 can thus determine the status of all essential parts of the system and use this information in deciding what to do next.

The fact that the time available for the inspection is both limited and expensive dictates that the inspection team have available to it, while the ultrasonic inspection is in progress, all of the data in the most readily understandable form. Only when this is done can unexpected situations be evaluated thoroughly and the necessary decisions made on the spot. If complete evaluation of indications is delayed by days or even hours, one can say with certainty that expensive time will be wasted in making new setups and repositioning for reexaminations.

The full power of the general-purpose digital computer 20 is used to convert A-scan information into large and meaningful B-scan or C-scan displays at their true positions on the part being inspected, and attach magnitude and significant information in real time. The display can be changed or modified at a typed command.

The CRT 24 will normally be used to display maps of flaw indications as these are found. These will be projected into true location on the part being inspected and scaled to fit the screen legibly. Complete information on location and magnitude will be included. The hard-copy device 28 will be used to obtain a permanent record of the display.

A written record is normally obtained on the teletype 20. Statements summarizing results in given regions will normally be typed out periodically. A sense-switch option will cause complete real-time tabulation of the data whenever this is desired.

A further option will cause all written information to be displayed on the CRT 24 instead of the teletype 20. Writing speeds on the CRT 24 are comparable to those obtainable on line printers, and permanent records can be obtained from the hard-copy device 28.

The primary data output of the system is on magnetic tape unit 22. The final output tape will be "IBM compatible" so that it can be read and analyzed further by almost any computer installation at any later date. IBM-compatible tape is essentially machine-independent, and is expected to remain a standard format for many years.

In a typical inspection, the part being inspected will be scanned on a predetermined rectangular grid pattern that is read into the computer at the start of each measurement. Grid spacing is nominally 0.5 in. With the nominal 1-in.-diam beam, this gives a factor of two to four redundancy in coverage of the volume being inspected in each transducer configuration. For manual operations the grid will also be overlaid on the part being inspected to guide the inspector.

If no flaw indications are found, the data will be recorded as a series of 0.5-in. long (range-gate determined) data at each grid position. This is equivalent to a numerical A-scan, and can in fact be used to reconstruct the A-scan if that were required.

Both grid spacing and effective volume element length will be reduced to define flaw indications more exactly, as these are encountered.

The skate 4 moves the sensor 2 in steps and comes to rest at each measurement position. In manual operations the inspector assures himself that coupling is obtained, then either pushes a "go" button or enters the coordinates of the new location, if it is different from the predetermined pattern. In automatic and semi-automatic modes the vertical (longitudinal wave) transducer is selected first by multiplex command. The computer 20 records the exact time of the onset of the back surface return echo with respect to the front surface, and the magnitude and variance of the return echo. If a back surface echo is expected at that location of the sensor 2 and not received, a "no coupling" message is typed out and the computer 20 waits for further instructions. With a return echo, the angle transducer is selected, and the computer 20 starts accepting data from each volume element in the beam, in turn.

The average value and variance are normalized to the appropriate signal obtained during prior calibration.

Each volume element in the beam at each position of the sensor 2 is examined for the presence of possible flaws. Four catagories of indications are defined. A Category 1 indication exists when there is no flaw indication (or no significant change from preservice values). A Category 2 indication exists when there is any significant change from preservice values. Category 3 indications exist whenever there is an indication larger than allowed by the Code. In Category 4 are lumped those indications significantly less than preservice values. While not directly indicating flaw possibilities, this last category of data may be taken as a sign of error in positioning or setup, and should be investigated.

Both echo magnitude and spatial extent are used to verify the presence of a flaw. The variance measurements permit the valid application of formal statistical tests for significance of differences in measured amplitudes. A modified combination of the chi-square and T-test will be used to compare measured amplitude and its variance for each volume element to (1) the appropriate calibration-block signal specified by the Code, and (2) preservice inspection data at the same location. Should the statistical tests indicate a significantly larger signal than either, the program goes into a special flaw-outline routine.

The flaw mapping routine is used to define the spatial extent of possible flaws and determine exact values. A flaw indication, either Catagory 2 or Category 3, is confirmed on the basis of continuity once the magnitude information points to the possibility of a flaw.

Because of the redundancy in ½ in. grid measurements with a beam at least 1 in. in diameter, any valid indication must extend over several grid squares. Any ideal point reflector must reflect sonic energy into at least two overlapping beam positions one-half in. apart. Depending on location, it may reflect energy into as many as four beam positions.

Flaw-mapping is a pattern-recognition routine in which the computer 20 moves the sensor 2 so as to define a closed area of the grid pattern which has boundaries without flaw indication. In this search, the grid size is reduced to about one-fourth in., depending on part thickness. If the enclosed area has a sufficient number of squares with flaw indications, the presence of a flaw is confirmed.

Obviously, numerous variations and modifications may be made without departing from the present invention. Accordingly, it should be clearly understood that the form of the present invention described above and shown in the accompanying drawing is illustrative only and is not intended to limit the scope of the invention.

What is claimed is:
1. A method for performing repetitive comparative inspection of volume elements of a wall comprising the steps of:
   mounting an ultrasonic sensor on said wall,
   moving said sensor to successive positions along a predetermined inspection path on said wall to obtain inspection data of volume elements of said wall at each said position, said data being obtained in analog form and converted to digital form,
   recording said digital inspection data pertaining to each of said positions in an electronic memory for subsequent electronic readout as comparison data, performing a subsequent inspection of said wall by again mounting said sensor on said wall and moving said sensor to said previously inspected positions along said predetermined inspection path to obtain subsequent inspection data at each of said positions, said subsequent inspection data being obtained in analog form from said sensor and converted to digital form,
   automatically and electronically obtaining from said memory in real time a readout of said comparison data of each corresponding position along said predetermined inspection path during said subsequent inspection,
   automatically and electronically comparing in real time said comparison data pertaining to each position along said predetermined inspection path with said subsequent inspection data, and
   displaying a signal indicative of any significant difference between said subsequent inspection data and said comparison data for each said position along said predetermined inspection path, thereby providing an indication of any change in the condition of volume elements of said wall at any inspected position.
2. A method as defined in claim 1 wherein range gate timing of sensor signals is used to develop said inspection data for points located at different depths in said wall at each of said positions along said predetermined inspection path.
3. Apparatus employing an ultrasonic sensor for performing repetitive comparative inspection of volume elements of a wall comprising:
   means for mounting said ultrasonic sensor on said wall,
   means moving said sensor to successive positions along a predetermined inspection path along said wall,
   means cooperating with said sensor for obtaining inspection data of volume elements of said wall at each said position, said data being obtained in analog form,
   means for converting said data from analog to digital form,
   an electronic memory for storing in retrievable form said digital data,
   means for recording said digital inspection data pertaining to each of said positions in said electronic memory for readout as comparison data during a subsequent inspection of said wall performed by again mounting said sensor on said wall and moving said sensor to said previously inspected positions along said predetermined inspection path to obtain subsequent inspection data at each of said positions, said subsequent inspection data being obtained in analog form from said sensor and converted to digital form by said converting means, means for automatically and electronically obtaining from said memory in real time a readout of said comparison data of each corresponding position along said predetermined inspection path during said subsequent inspection, means for automatically and electronically comparing in real time said comparison data pertaining to each position along said predetermined inspection path with said subsequent inspection data, and means for displaying a signal indicative of any significant difference between said subsequent inspection data and said previously recorded inspection data for each said position along said predetermined inspection path, thereby providing an indication of any change in the condition of volume elements of said wall at any inspected position.

4. Apparatus as defined in claim 3 wherein said means for obtaining said inspection data includes means for range gate timing of sensor signals to develop said inspection data for points located at different depths in said wall at each of said positions along said predetermined inspection path.

* * * * *

UNITED STATES PATENT AND TRADEMARK OFFICE
CERTIFICATE OF CORRECTION

PATENT NO. : 3,857,052
DATED : Dec. 24, 1974
INVENTOR(S) : Laurence S. Beller

It is certified that error appears in the above-identified patent and that said Letters Patent are hereby corrected as shown below:

Line 3 of Abstract, "snesor" should read --sensor--.

Column 2, line 67, "said" (first occurrence) should read --store--.

Column 3, line 12, "ssaid" should read --said--.

Signed and Sealed this sixteenth Day of December 1975

[SEAL]

Attest:

RUTH C. MASON
*Attesting Officer*

C. MARSHALL DANN
*Commissioner of Patents and Trademarks*